S. J. COUGHRAN.
TRACTOR SEAT.
APPLICATION FILED NOV. 11, 1920.
1,385,521.                        Patented July 26, 1921.
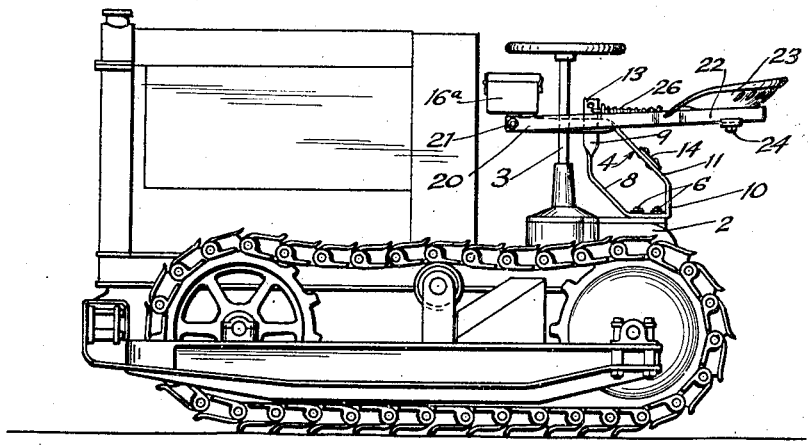
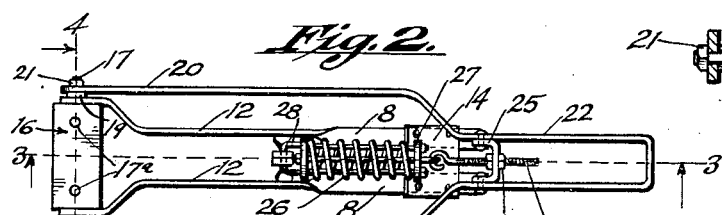
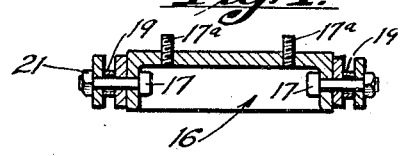
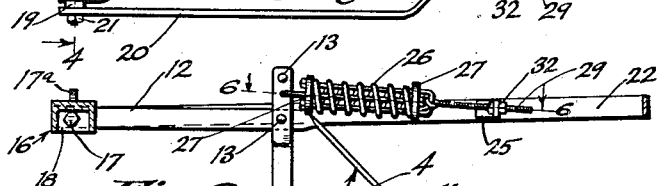
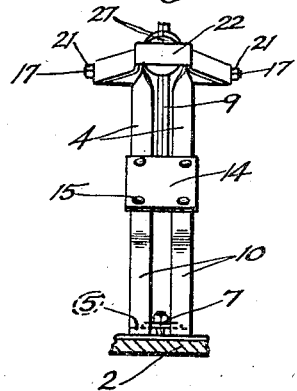
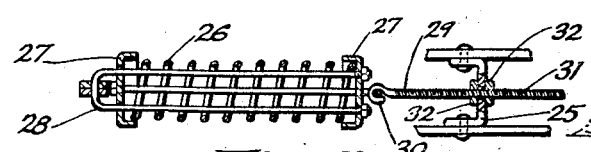

UNITED STATES PATENT OFFICE.

SAMUEL J. COUGHRAN, OF BUENA PARK, CALIFORNIA.

TRACTOR-SEAT.

1,385,521.　　　　Specification of Letters Patent.　　Patented July 26, 1921.

Application filed November 11, 1920. Serial No. 423,399.

*To all whom it may concern:*

Be it known that I, SAMUEL J. COUGHRAN, a citizen of the United States, residing at Buena Park, in the county of Orange and State of California, have invented new and useful Improvements in Tractor-Seats, of which the following is a specification.

It is the object of this invention to provide a seat for tractors and the like which is provided with a novel spring support adapted to form an easy riding construction.

The invention will be readily understood from the following description of the accompanying drawings, in which:

Figure 1 is a side elevation showing a tractor provided with the improved spring support for the seat.

Fig. 2 is a plan view of the spring support for the seat.

Fig. 3 is a vertical section on the line 3—3 of Fig. 2.

Fig. 4 is a transverse section on the line 4—4 of Fig. 2.

Fig. 5 is a rear elevation of the seat support.

Fig. 6 is a detail section on the line 6—6 of Fig. 3.

I have illustrated the improved seat support as employed upon a tractor of usual construction including a base 2 carrying the steering post 3. The seat support is mounted upon base 2 in rear of the steering post so as to position the seat carried by the support conveniently to the steering post.

The seat support consists of a bracket including side members 4 arranged alongside of one another and having portions 5 intermediate of their ends resting upon the base 2. These portions 5 are arranged in parallel spaced relation and are detachably fixed to the base 2 by means of clamping bolts 6 supporting clamping plates 7 engaging the portions 5 of the bracket members. The bracket members at one end of the portions 5 are bent upwardly as shown at 8 and are then vertically disposed in spaced parallel relation as shown at 9 with the flat sides of said portions of the bracket members turned toward one another.

The bracket members at the opposite end of portions 5 are bent upwardly as shown at 10 and are then inclined forwardly as shown at 11 so as to terminate in parallel spaced arms 12 disposed at a substantially horizontal plane and crossing the uprights 9 so as to extend beyond the same. The ends of uprights 9 may be connected as by the rivets 13 and the two members forming the bracket may be also connected along the inclined portions 11 of the same as by the plate 14 suitably riveted as shown at 15 to the respective bracket members.

The forward ends of arms 12 carry a support 16 between the same, said support being shown as a reversed channel iron. A tool box 16ª or the like may be mounted upon the support 16 as by bolts 17ª extending upwardly through the same. The bolts 17 project through end plates 18 provided on this channel iron so that the ends of arms 12 may be received upon said bolts in position to abut against the ends of the channel iron support. Washers 19 are, preferably, received upon the bolts against the ends of arms 12 and the ends of arms 20 forming a bracket carrying the seat received upon the bolts against the washers 19 with the nuts 21 of said bolts received against the arms 20 so as to secure the parts in the position thus described.

The arms 20 extend rearwardly and form a bracket loop 22 upon which a seat 23 of usual construction may be mounted by means of a bolt and nut connection 24. The arms 20 of the seat bracket are pivotally mounted upon bolts 17 so that the end of the bracket carrying the seat may swing up and down. A resilient connection is provided between this swinging end of the seat bracket and the supporting bracket 4 so as to yieldably retain the seat bracket in a substantially horizontal position while committing vertical swing thereof against the tension of the resilient connection.

As an instance of this arrangement a coil spring connection is provided between the uprights 9 of the supporting bracket and a brace 25 extending across the loop 22 of the seat bracket. This spring construction includes a coil spring 26 having end caps 27 received over the ends of the spring. A U-bolt 28 has its ends fixed to one of the end caps and extends through the coils of the spring and through the other end cap with the loop of the U-bolt projecting beyond this second cap. The second cap is slidable along the U-bolt so that it may be drawn toward the first end cap and thereby compress the spring between said end caps. The loop of the U-bolt is received through the uprights 9, preferably, above the point where the arms 12 cross said uprights, and a connection is provided between the end cap 27 slidable along the U-bolt and the brace 25, so that the tension of spring 26 will normally retain the end caps in spaced relation and thus provide a support for the pivoted seat bracket.

The connection between the slidable end cap and brace 25 may include a rod 29 extending from the end cap through the coils of spring 26 and slidably received through the first end cap. Beyond the first end cap this rod is engaged by a hooked rod 30 which is received through a suitable opening in the brace 25. This rod is threaded as shown at 31, and nuts 32 are threaded upon the rod at the respective sides of brace 25 so that the rod may be adjustably positioned with relation to the brace through rotation of said nuts.

By the construction as thus described it will be seen that the spring 26 will normally hold the seat bracket against pivotal movement and in a substantially horizontal plane as shown in Fig. 1. The vibrations of the tractor, as it passes over uneven surfaces, will be transmitted to the supporting bracket 4, but said vibrations will be cushioned by the yield of spring 26 before reaching the seat bracket, and as a consequence an easy riding seat is provided. It will be noted that the tension of spring 26 may be readily adjusted by adjusting rod 30 with relation to brace 25, and as a consequence the cushioning effect produced by the spring may be varied as found desirable to produce an easy riding construction.

Various changes may be made without departing from the spirit of the invention as claimed.

What is claimed is:

1. A spring seat comprising a support including members alongside one another and each comprising a base portion, an upright arm at one end thereof, and a forwardly projecting arm at the other end, a bracket carrying the seat pivoted to said forwardly projecting arms, and a yieldable spring connection between said bracket and the upright arms.

2. A spring seat comprising a support including a projecting arm, a bracket pivoted to said projecting arm and extending rearwardly past said support with the seat upon its rear end, and a yieldable spring connection between said rear end of the bracket and said support.

3. A spring seat comprising a support, having an upright arm and a forwardly projecting arm, a bracket pivoted to the forwardly projecting arm and carrying the seat, a yieldable spring connection between said bracket and said upwardly projecting arm, and means for adjusting said spring connection.

4. A spring seat comprising a support, a bracket pivoted thereto and carrying the seat, and a spring connection between said bracket and support including a spring, and members secured to said bracket and support respectively, said members being adapted to compress said spring between the same to permit pivotal yield of said bracket.

In testimony whereof I have signed my name to this specification.

SAMUEL J. COUGHRAN.